(12) United States Patent
Sugimoto et al.

(10) Patent No.: US 7,957,498 B2
(45) Date of Patent: Jun. 7, 2011

(54) DATA RECEIVER DEVICE AND DATA TRANSMISSION/RECEPTION SYSTEM

(75) Inventors: Hirokazu Sugimoto, Osaka (JP); Toru Iwata, Osaka (JP)

(73) Assignee: Panasonic Corporation, Osaka (JP)

( * ) Notice: Subject to any disclaimer, the term of this patent is extended or adjusted under 35 U.S.C. 154(b) by 719 days.

(21) Appl. No.: 11/995,423

(22) PCT Filed: Jul. 10, 2006

(86) PCT No.: PCT/JP2006/313705
§ 371 (c)(1),
(2), (4) Date: Jan. 11, 2008

(87) PCT Pub. No.: WO2007/023620
PCT Pub. Date: Mar. 1, 2007

(65) Prior Publication Data
US 2009/0086852 A1    Apr. 2, 2009

(30) Foreign Application Priority Data
Aug. 25, 2005   (JP) .................. 2005-243900

(51) Int. Cl.
*H04L 7/00* (2006.01)
(52) U.S. Cl. ........................... 375/355; 375/376
(58) Field of Classification Search .......... 375/354–359, 375/368, 376
See application file for complete search history.

(56) References Cited

U.S. PATENT DOCUMENTS

| | | | | |
|---|---|---|---|---|
| 5,208,833 A | * | 5/1993 | Erhart et al. | 375/294 |
| 5,838,749 A | * | 11/1998 | Casper et al. | 375/376 |
| 5,889,423 A | | 3/1999 | Trumpp | |
| 5,898,842 A | * | 4/1999 | Hakimi | 709/250 |
| 6,700,943 B1 | * | 3/2004 | Miller | 375/354 |
| 6,980,616 B1 | * | 12/2005 | Nakano et al. | 375/364 |
| 7,149,914 B1 | * | 12/2006 | Asaduzzaman et al. | 713/500 |
| 7,532,697 B1 | * | 5/2009 | Sidiropoulos et al. | 375/376 |
| 2001/0008550 A1 | * | 7/2001 | Takahashi | 375/368 |
| 2004/0264614 A1 | * | 12/2004 | Tinker | 375/355 |

FOREIGN PATENT DOCUMENTS

| | | |
|---|---|---|
| JP | 04-293332 | 10/1992 |
| JP | 05-219040 | 8/1993 |
| JP | 9-508775 | 9/1997 |

* cited by examiner

*Primary Examiner* — Emmanuel Bayard
(74) *Attorney, Agent, or Firm* — McDermott Will & Emery LLP (57) ABSTRACT

The data receiver device includes: a bit phase synchronizing circuit (10) for performing phase adjustment of a received data signal to set a predetermined phase relationship between the data signal and a corresponding clock signal; and a state detection circuit (20) for outputting a detection signal once detecting that the data signal inputted into the bit phase synchronizing circuit (10) is in a stable state based on a data signal phase-adjusted by the bit phase synchronizing circuit (10) and a corresponding clock signal. The bit phase synchronizing circuit (10) initializes the phase adjustment of the data signal when receiving the detection signal.

11 Claims, 10 Drawing Sheets

DATA RECEIVER DEVICE AND DATA TRANSMISSION/RECEPTION SYSTEM

RELATED APPLICATIONS

This application is the U.S. National Phase under 35 U.S.C. §371 of International Application No. PCT/JP2006/313705, filed on Jul. 10, 2006, which in turn claims the benefit of Japanese Application No. 2005-243900, filed on Aug. 25, 2005, the disclosure of which Applications are incorporated by reference herein.

TECHNICAL FIELD

The present invention relates to a data receiver device and a data transmission/reception system, and more particularly to a technology for improving the reliability of data reception in digital signal communications.

BACKGROUND ART

In recent data transmission/reception systems used for high-speed digital communications, a serial transmission scheme of transmitting a data signal serially has become mainstream. For high-speed synchronous processing of a serially transmitted data signal, a bit phase synchronizing circuit is often used. The bit phase synchronizing circuit adjusts the phase of an inputted data signal to have a predetermined relationship with the is phase of a clock signal, to thereby ensure errorless reception of the serially transmitted data signal.

Figure 11:
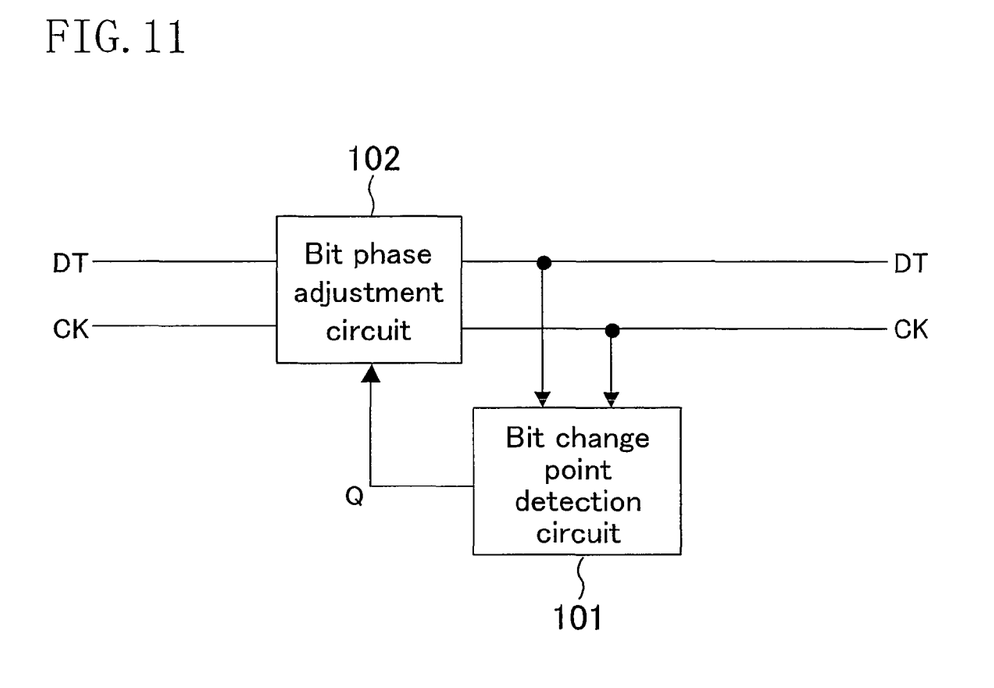
FIG. 11 is a block diagram of a bit phase synchronizing circuit.

FIG. 11 shows a configuration of a bit phase synchronizing circuit. A bit change point detection circuit 101 detects the time relationship between a transition point of a data signal DT and an edge of a clock signal CK based on a data signal DT phase-adjusted by a bit phase adjustment circuit 102 and a corresponding clock signal CK, to output a phase information signal Q on the phases of the data signal DT and the clock signal CK. The bit phase adjustment circuit 102, which has a variable delay circuit (not shown) receiving the data signal DT, phase-adjusts the data signal DT based on the phase information signal Q received from the bit change point detection circuit 101. Specifically, the bit phase adjustment circuit 102 performs a phase adjustment such as delaying the data signal DT if the setup time of the data signal DT is insufficient but performing no such delay processing if the hold time of the data signal DT is insufficient. With this, the phase of the data signal DT is adjusted so that a rising change in the clock signal CK occurs at a phase of the data signal DT near the middle point between a level transition of the data signal DT and its next level transition, to enable latching of the data signal DT with the clock signal CK (see Patent Document 1, for example).

Patent Document 1: Japanese Laid-Open Patent Publication No. 4-293332

DISCLOSURE OF THE INVENTION

Problems to be Solved by the Invention

Under circumstances such as during an initial period of signal input and during device startup, the amplitude of an inputted data signal is not stable and the jitter amount may even exceed an allowable value. If the bit phase synchronizing circuit performs phase adjustment for the inputted data signal under such unstable circumstances, the phase adjustment may possibly be completed at a point near the limit of the phase adjustment range. If this occurs, it may be impossible to perform further phase adjustment of the data signal after the state of the data signal has been stabilized.

For example, suppose the bit phase synchronizing circuit described above performs the phase adjustment of delaying a data signal to the maximum under circumstances where the data signal is unstable and after this phase adjustment the data signal becomes stable. In this case, if it is intended to further delay the phase of the data signal, the delaying processing is no more possible because it has already been done to the limit of the phase adjustment range. As a result, the bit phase adjustment circuit will have to perform phase adjustment again. During this renewed phase adjustment, the phase relationship between the data signal and the clock signal outputted from the bit phase synchronizing circuit has not been established, and thus a downstream circuit may possibly fail to perform correct signal processing.

When the bit phase synchronizing circuit described above is used in a data transmission/reception system conforming to the DVI (Digital Visual Interface) standard, the phase adjustment of a video signal (data signal) by the bit phase synchronizing circuit may be completed at a point near the limit of the phase adjustment range at a stage where the video signal is just inputted and still in an unstable state, and signal processing may be performed based on the video signal incomplete in phase adjustment. In this event, no problem may especially arise as long as the error rate (rate of error of the received signal with respect to the transmitted signal) is too low to be observed visually by humans on a device displaying the video signal. However, in the HDMI (High-Definition Multimedia Interface) standard, for example, in which a code signal is superimposed on a video signal, a problem of failing to display an image may arise if the above event occurs in a HDMI-compliant data transmission/reception system. As described above, if the phase adjustment of a data signal is finalized under circumstances where the inputted data signal is unstable, it is difficult to perform phase adjustment after the data signal is stabilized, decreasing the error rate. This may cause failure in display of an image at worst.

In view of the above, an object of the present invention is improving the reliability of data reception in a data receiver device.

Means for Solving the Problems

To attain the above object, the data receiver device of the present invention is a data receiver device for receiving a data signal to perform predetermined signal processing, including: a bit phase synchronizing circuit for performing phase adjustment of the data signal to set a predetermined phase relationship between the data signal and a corresponding clock signal; and a state detection circuit for outputting a detection signal once detecting that the data signal inputted into the bit phase synchronizing circuit is in a stable state based on a data signal phase-adjusted by the bit phase synchronizing circuit and a corresponding clock signal. The bit phase synchronizing circuit initializes the phase adjustment of the data signal when receiving the detection signal.

With the above configuration, the received data signal is once phase-adjusted by the bit phase synchronizing circuit. When detecting that the data signal is in a stable state based on the phase-adjusted data signal and the corresponding clock signal, the state detection circuit outputs a detection signal. In response to the detection signal, the bit phase synchronizing circuit initializes the phase adjustment of the data signal. In this way, phase adjustment of the data signal can be made again after the data signal has been stabilized, and thus the reliability of data reception improves.

Specifically, the state detection circuit may output the detection signal once detecting a predetermined signal pattern in the phase-adjusted data signal. Preferably, the state detection circuit outputs the detection signal once detecting the predetermined signal pattern a plurality of times. Otherwise, preferably, the state detection circuit outputs the detection signal once detecting the predetermined signal pattern at a predetermined period.

Preferably, the data receiver device described above further includes an output control circuit for controlling output or not of the phase-adjusted data signal and the corresponding clock signal. The output control circuit may control the output of the phase-adjusted data signal and the corresponding clock signal when receiving the detection signal.

Preferably, the data receiver device described above further includes a signal processing section for performing the predetermined signal processing based on the phase-adjusted data signal and the corresponding clock signal when receiving the detection signal.

The bit phase synchronizing circuit described above may be a clock recovery circuit for generating the clock signal from the data signal.

The data receiver device described above may include a plurality of said bit phase synchronizing circuits. In this case, the state detection circuit may output the detection signal once detecting that a data signal inputted into at least one of the plurality of bit phase synchronizing circuits is in a stable state based on a data signal phase-adjusted by the at least one bit phase synchronizing circuit and a corresponding clock signal. Moreover, the state detection circuit may output the detection signal once detecting that all data signals inputted into the plurality of bit phase synchronizing circuits are in a stable state based on data signals phase-adjusted by the plurality of bit phase synchronizing circuits and corresponding clock signals.

Preferably, the data receiver device described above further includes an output control circuit for controlling output or not of a plurality of data signals phase-adjusted by the plurality of bit phase synchronizing circuits and corresponding clock signals. The output control circuit may control the output of the plurality of phase-adjusted data signals and the corresponding clock signals when receiving the detection signal.

The data transmission/reception system of the present invention is a data transmission/reception system including: a data receiver device having a bit phase synchronizing circuit for performing phase adjustment of an inputted data signal to set a predetermined phase relationship between the data signal and a corresponding clock signal; and a data transmitter device for transmitting the data signal to the data receiver device, wherein the data receiver device may output a reception acknowledge signal when succeeding in receiving normally a data signal phase-adjusted by the data receiver device and a corresponding clock signal, the data transmitter device outputs a detection signal when receiving the reception acknowledge signal, and the bit phase synchronizing circuit of the data receiver device initializes the phase adjustment of the data signal when receiving the detection signal.

With the above configuration, the data signal transmitted from the data transmitter device is phase-adjusted by the bit phase synchronizing circuit. The data receiver device outputs a reception acknowledge signal when having received normally the phase-adjusted data signal and a corresponding clock signal. The data transmitter device outputs a detection signal in response to the reception acknowledge signal. With the output of the detection signal, the bit phase synchronizing circuit initializes the phase adjustment of the data signal. In this way, phase adjustment of the data signal can be made again after the data signal has been received normally by the data receiver device, and thus the reliability of data reception improves.

Effect of the Invention

As described above, according to the present invention, after execution of phase adjustment of a data signal in an unstable state received under circumstances such as during an initial period of signal input, during device startup and during temperature rise, the data signal, which has become stable, can be phase-adjusted again. Thus, highly reliable data reception is permitted.

DESCRIPTION OF REFERENCE NUMERALS

10 Bit phase synchronizing circuit
20 State detection circuit
30 Signal processing section
40 Output control circuit
100 Data receiver device
200 Data transmitter device

BEST MODE FOR CARRYING OUT THE INVENTION

Hereinafter, the best mode for carrying out the present invention will be described with reference to the relevant drawings. Note that like components are denoted by the same reference numerals.

Embodiment 1

Figure 1:
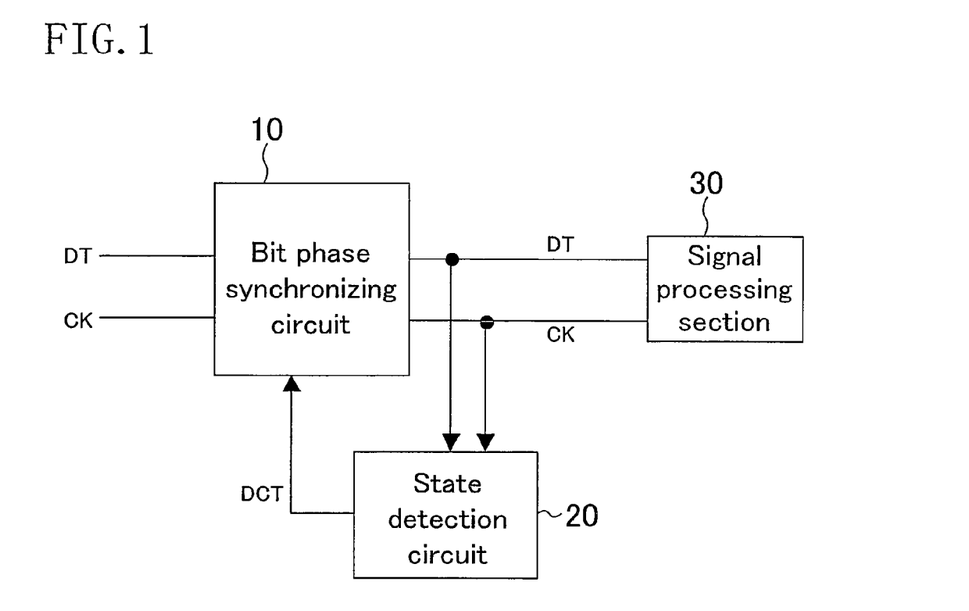
FIG. 1 is a block diagram of a data receiver device of Embodiment 1.

FIG. 1 shows a configuration of a data receiver device of Embodiment 1 of the present invention. The data receiver device of this embodiment includes a bit phase synchronizing circuit 10, a state detection circuit 20 and a signal processing section 30.

The bit phase synchronizing circuit 10, receiving a data signal DT and a clock signal CK, performs phase adjustment of the data signal DT. More specifically, the bit phase synchronizing circuit 10 adjusts the phase of the data signal DT so that the data signal DT can be latched with the clock signal CK. The signal processing section 30 performs predetermined signal processing based on the phase-adjusted data signal DT and the clock signal CK.

The state detection circuit 20 detects whether or not the data signal DT inputted into the bit phase synchronizing circuit 10 is in a stable state based on the data signal DT outputted from the bit phase synchronizing circuit 10 and the clock signal CK. The stable state of the data signal DT as used herein refers to the state of having a desirable amplitude value and a jitter component falling within an allowable range. The state detection circuit 20 outputs a detection signal DCT once detecting that the data signal DT is in the stable state.

In general, a data signal transmitted in a data transmission/reception system includes periodic signal patterns of a start signal, a sync signal, a bit sync signal, a frame sync signal and the like. The state detection circuit 20 may simply output the detection signal DCT when detecting such a signal pattern.

Setting may be made so that the data signal DT is detected as being in a stable state when a signal pattern is detected just once. In this case, however, if the signal pattern happens to be detected due to noise and the like, the data receiver device may cause a malfunction. For this reason, the state detection circuit 20 may be made to output the detection signal DCT when detecting the signal pattern a plurality of times. Alternatively, utilizing the feature that a signal pattern appears periodically, the state detection circuit 20 may be provided with a timer function so as to output the detection signal DCT when detecting the signal pattern at a predetermined period. For example, if the data signal DT is a video signal, it is possible to detect whether or not the data signal DT is in a stable state by detecting a horizontal sync signal or a vertical sync signal included in the vide signal.

When receiving the detection signal DCT, the bit phase synchronizing circuit 10 initializes the once-executed phase adjustment of the data signal DT. In other words, the state detection circuit 20 resets the phase relationship between the data signal DT and the clock signal CK set by the bit phase synchronizing circuit 10 when detecting that the data signal DT is in a stable state. Once the phase relationship between the data signal DT and the clock signal CK is reset, the bit phase synchronizing circuit 10 adjusts again the phase of the data signal DT that is now in a stable state starting from near the center of the adjustable range, to reestablish the phase relationship between the data signal DT and the clock signal CK. In this way, by using the data signal DT and the clock signal CK that are in the reestablished phase relationship, the data signal DT can be latched more reliably, and thus the error rate in the signal processing section 30 improves.

Figure 2:
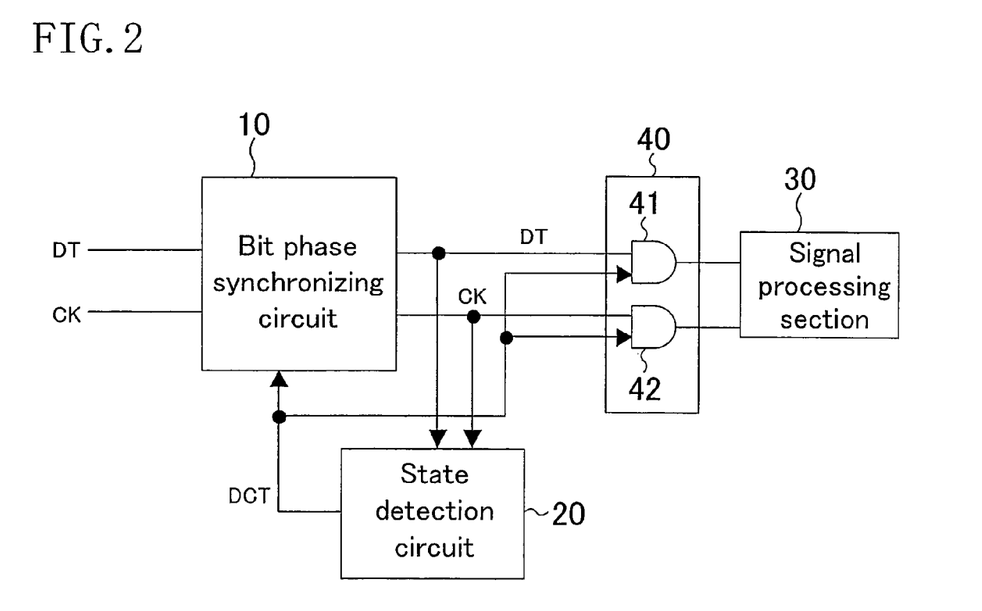
FIG. 2 is a view showing an example of the data receiver device of FIG. 1 in which an output control circuit is additionally provided.

Having the possibility of failing to perform correct signal processing under circumstances where the data signal DT is unstable, the signal processing section 30 should preferably perform signal processing based on the data signal DT that is in a stable state and a corresponding clock signal. In view of this, as shown in FIG. 2, the data receiver device of this embodiment may further be provided with an output control circuit 40. Specifically, the output control circuit 40 includes an AND gate 41 that operates AND between the data signal DT outputted from the bit phase synchronizing circuit 10 and the detection signal DCT and an AND gate 42 that operates AND between the clock signal CK outputted from the bit phase synchronizing circuit 10 and the detection signal DCT. Having such an output control circuit 40, the signal processing section 30 will receive the data signal DT and the clock signal CK only when the data signal DT is in a stable state. Note that in place of the AND gates 41 and 42, switches turned ON/OFF with the detection signal DCT, for example, may be provided.

Figure 3:
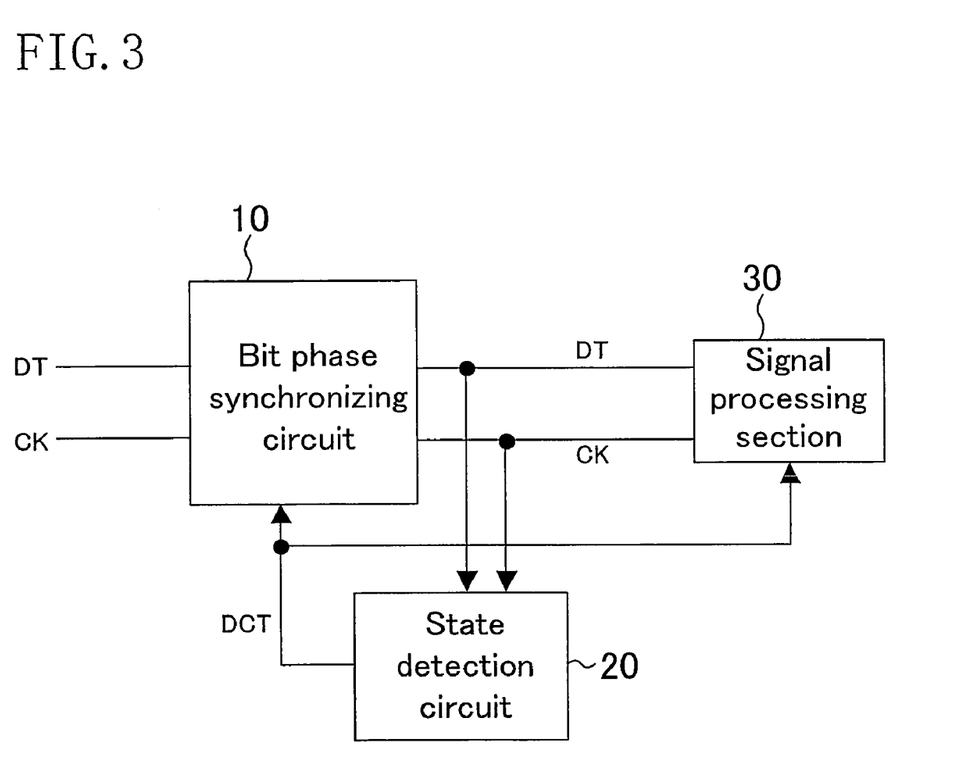
FIG. 3 is a view showing an example of the data receiver device of FIG. 1 in which a signal processing section is controlled with a detection signal.

Otherwise, as shown in FIG. 3, the signal processing section 30 may be controlled with the detection signal DCT. With this control, once the data signal DT becomes stable, the signal processing section 30 performs predetermined signal processing based on the supplied data signal DT and clock signal CK.

If the data signal DT and the corresponding clock signal CK are considered as one channel input, the data receiver device of Embodiment 1 is adaptive to receive signals of one channel. The present invention is not limited to such one-channel data receiver devices, but is also applicable to data receiver devices supporting a plurality of channels. Hereinafter, data receiver devices supporting a plurality of channels will be described. Note that subscripts identifying respective channels are added to the reference numerals and codes representing bit phase synchronizing devices, data signals and clock signals in the drawings referred to in the following description.

Embodiment 2

Figure 4:
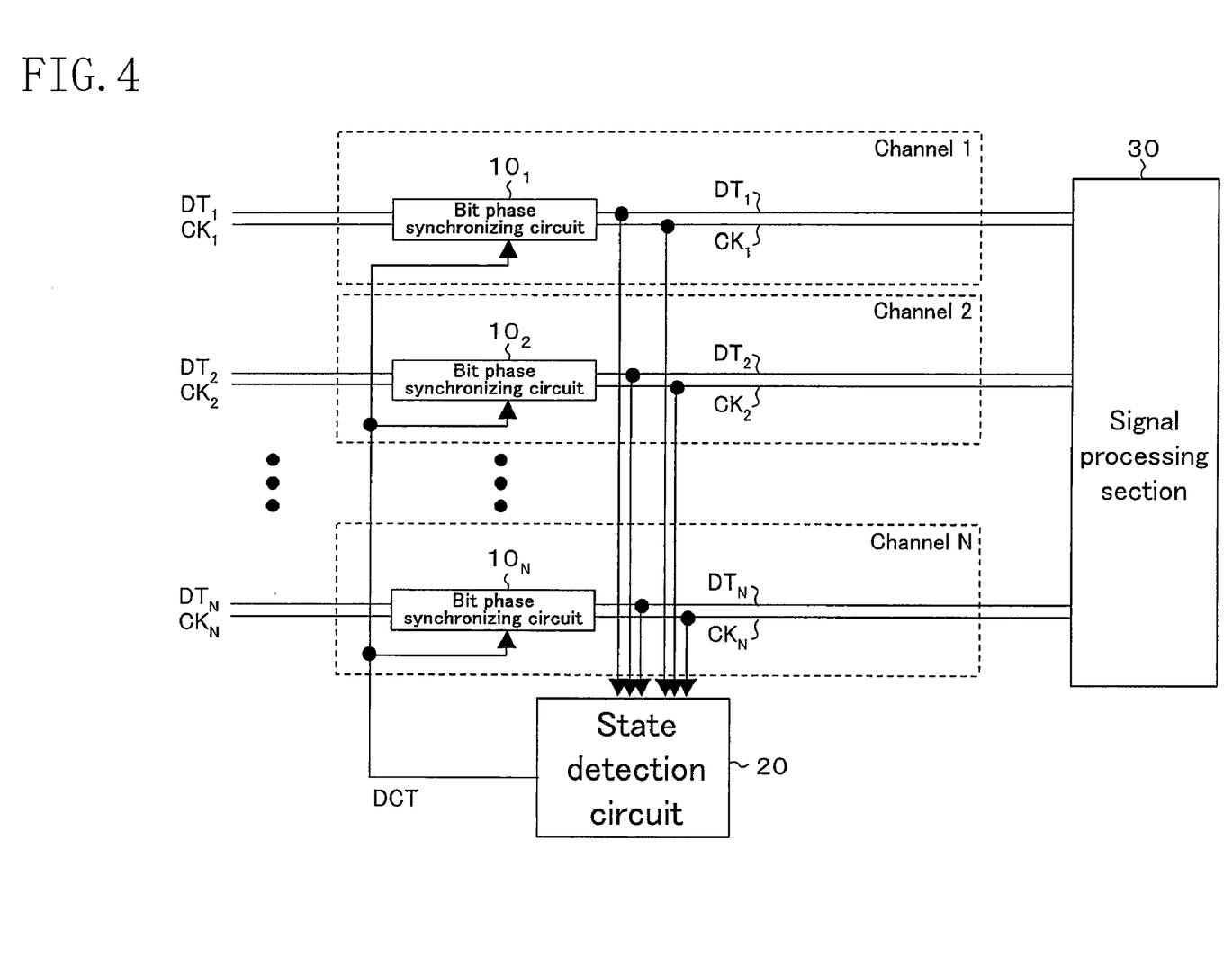
FIG. 4 is a block diagram of a data receiver device of Embodiment 2.

FIG. 4 shows a configuration of a data signal receiver device of Embodiment 2 of the present invention. The data receiver device of this embodiment includes N (N is an integer equal to or more than 2) bit phase synchronizing circuits 10, a state detection circuit 20 and a signal processing section 30.

In the data receiver device of this embodiment, the state detection circuit 20 detects whether or not data signals DT inputted into the respective bit phase synchronizing circuits 10 are in a stable state based on data signals DT and clock signals CK outputted from the respective bit phase synchronizing circuits 10. In other words, the state detection circuit 20, shared by all channels, detects whether or not all the channels inputted into the data receiver device are in a stable state. Once detecting that all the channels are in a stable state, the state detection circuit 20 outputs a detection signal DCT to the bit phase synchronizing circuits 10 of the respective channels. Upon receipt of the detection signal DCT, the respective bit phase synchronizing circuits 10 initialize the once-executed phase adjustment of the data signals DT.

Figure 5:
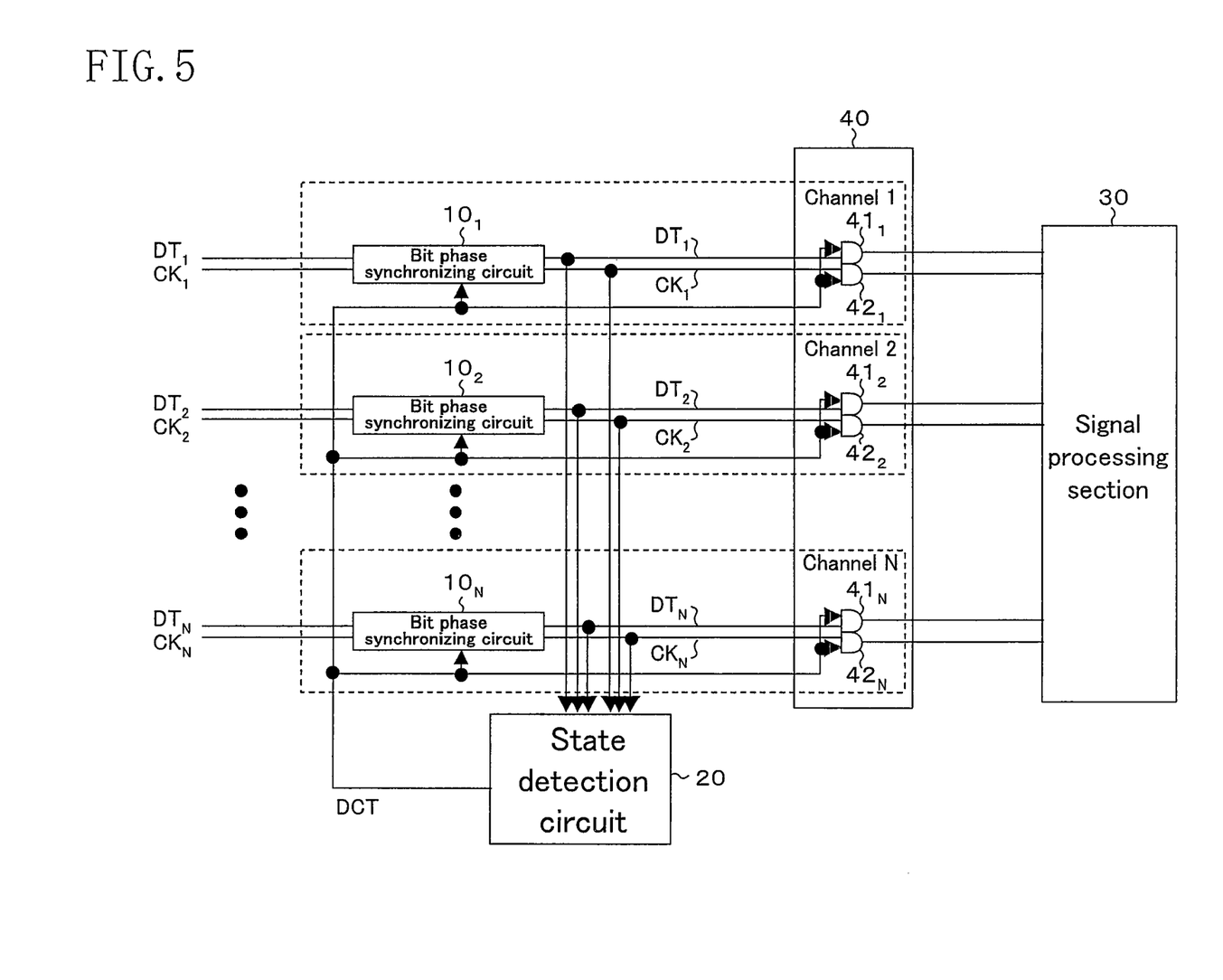
FIG. 5 is a view showing an example of the data receiver device of FIG. 4 in which an output control circuit is additionally provided.
Figure 6:
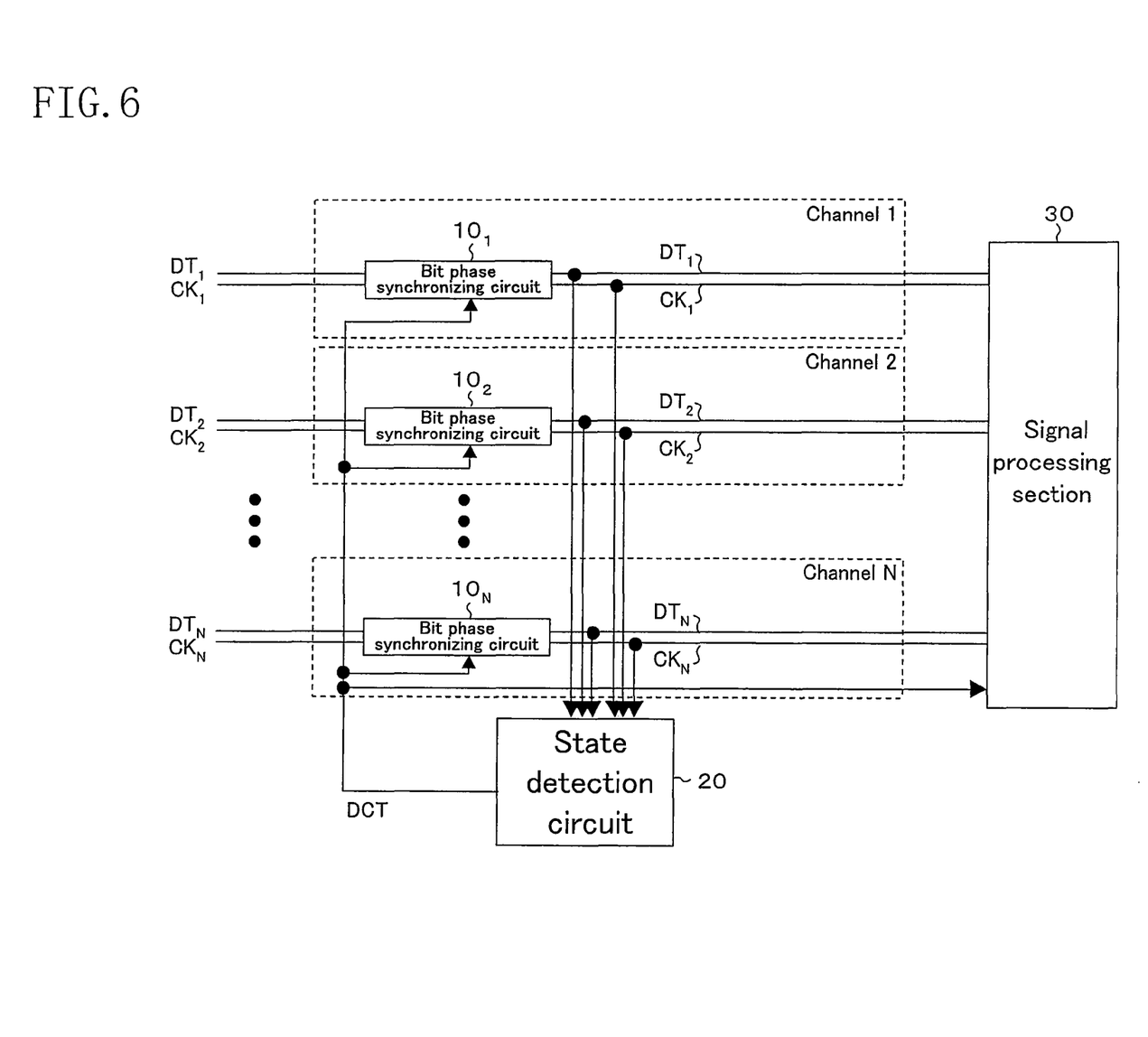
FIG. 6 is a view showing an example of the data receiver device of FIG. 4 in which a signal processing section is controlled with a detection signal.

As shown in FIG. 5, the data receiver device of this embodiment may be provided with an output control circuit 40 as in the case shown in FIG. 2. Otherwise, as shown in FIG. 6, the signal processing section 30 of the data receiver device of this embodiment may be controlled with the detection signal DCT as in the case shown in FIG. 3.

Embodiment 3

Figure 7:
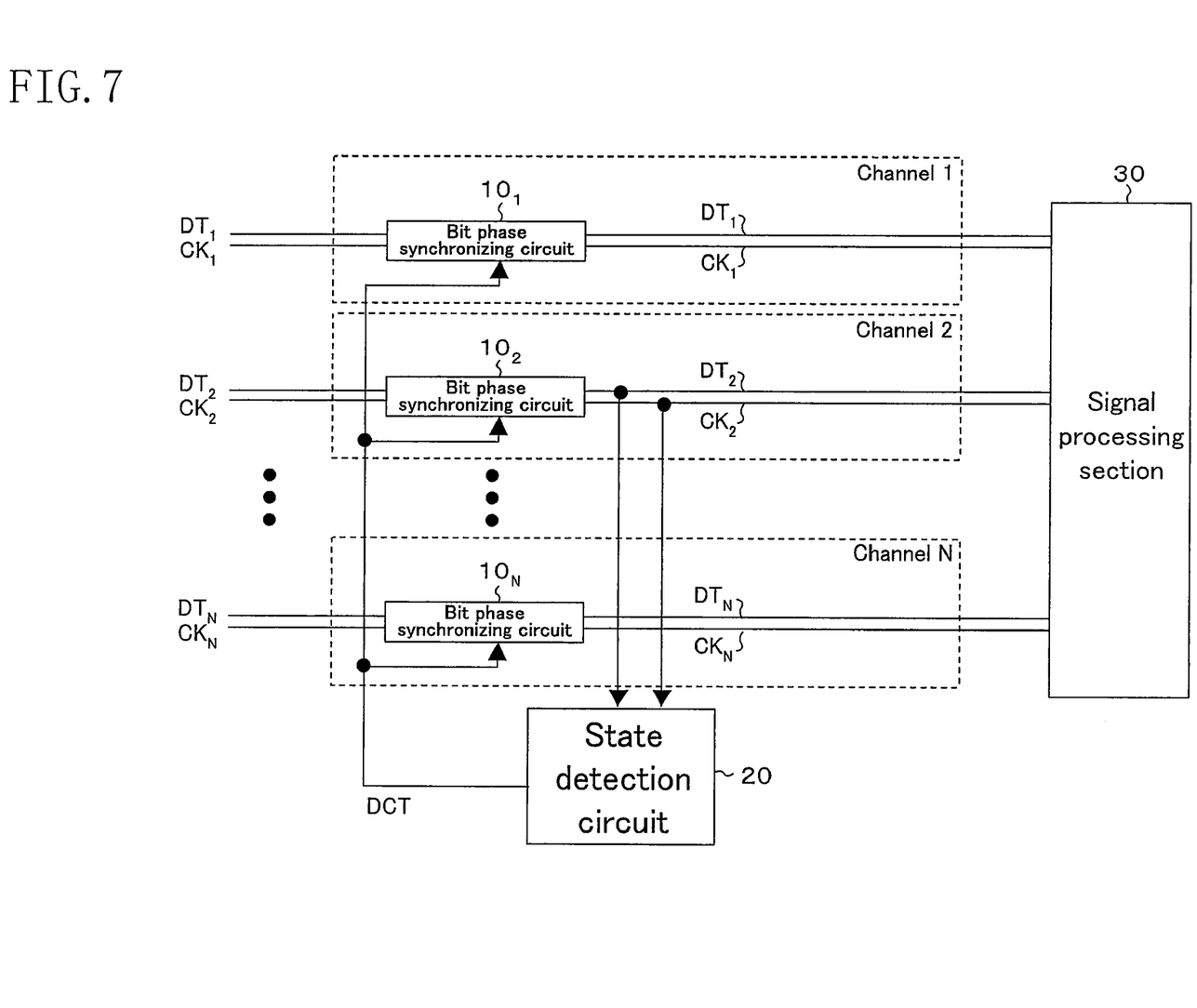
FIG. 7 is a block diagram of a data receiver device of Embodiment 3.

FIG. 7 shows a configuration of a data signal receiver device of Embodiment 3 of the present invention. The data receiver device of this embodiment includes N (N is an integer equal to or more than 2) bit phase synchronizing circuits 10, a state detection circuit 20 and a signal processing section 30.

The state detection circuit 20 in this embodiment, unlike that in Embodiment 2, detects whether or not a data signal DT inputted into a given bit phase synchronizing circuit 10 among the N bit phase synchronizing circuits 10 (the bit phase synchronizing circuit 10 of channel 2 in the example of FIG. 7) is in a stable state based on a data signal DT and a clock signal CK outputted from the given bit phase synchronizing circuits 10. Once detecting that the data signal DT is in a stable state, the state detection circuit 20 outputs a detection signal DCT to the bit phase synchronizing circuits 10 of all channels. Having this configuration, the data receiver device of this embodiment can attain more area and power savings than the data receiver device of Embodiment 2.

As for the selection of one among the N bit phase synchronizing circuits 10, the bit phase synchronizing circuit of a channel that transmits/receives a signal required for HDMI-compliant encryption may be selected. The reason is that since a code signal is superimposed on the video signal in the HDMI standard, a received signal with such a code signal superimposed thereon requires higher reliability.

Figure 8:
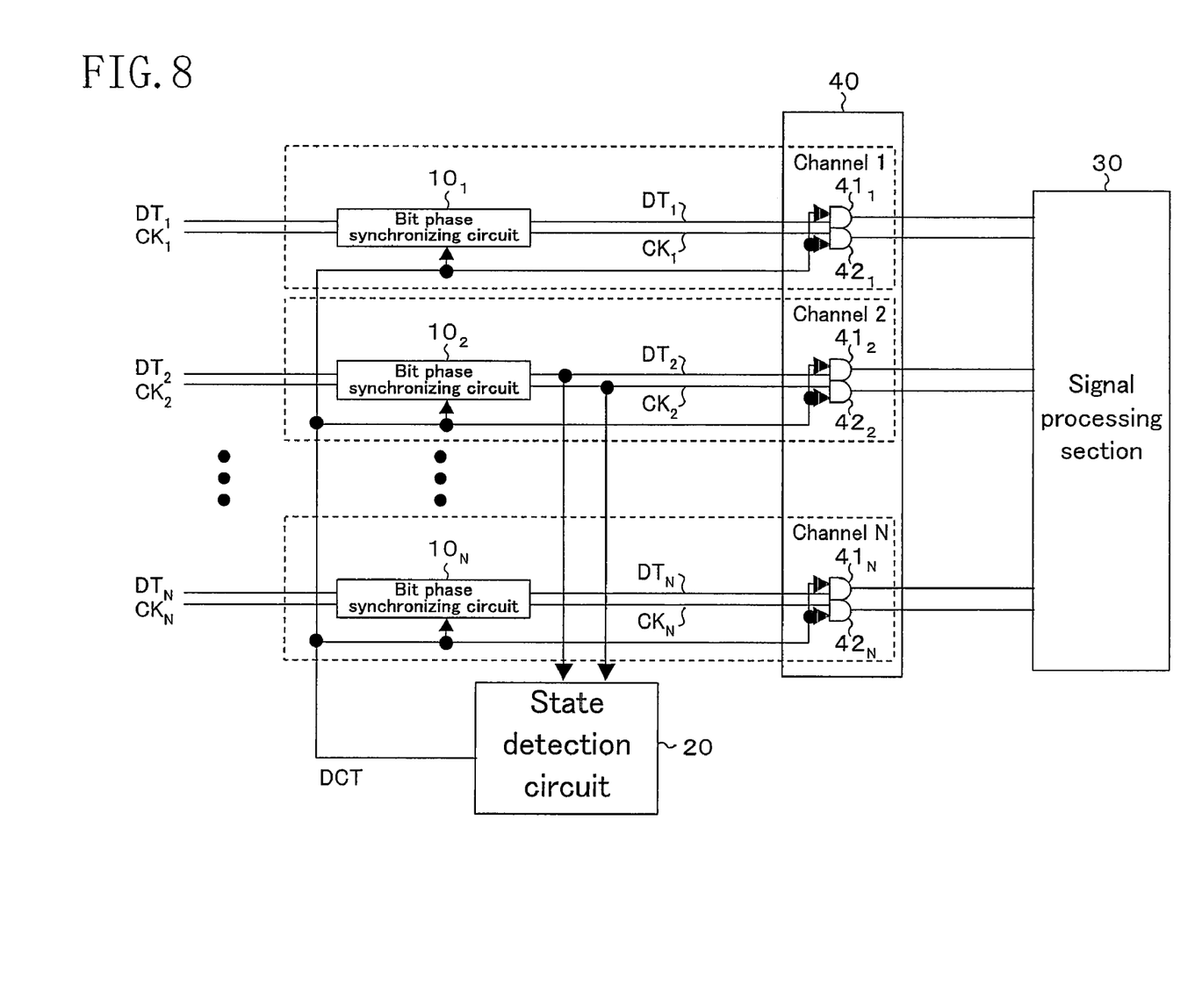
FIG. 8 is a view showing an example of the data receiver device of FIG. 7 in which an output control circuit is additionally provided.
Figure 9:
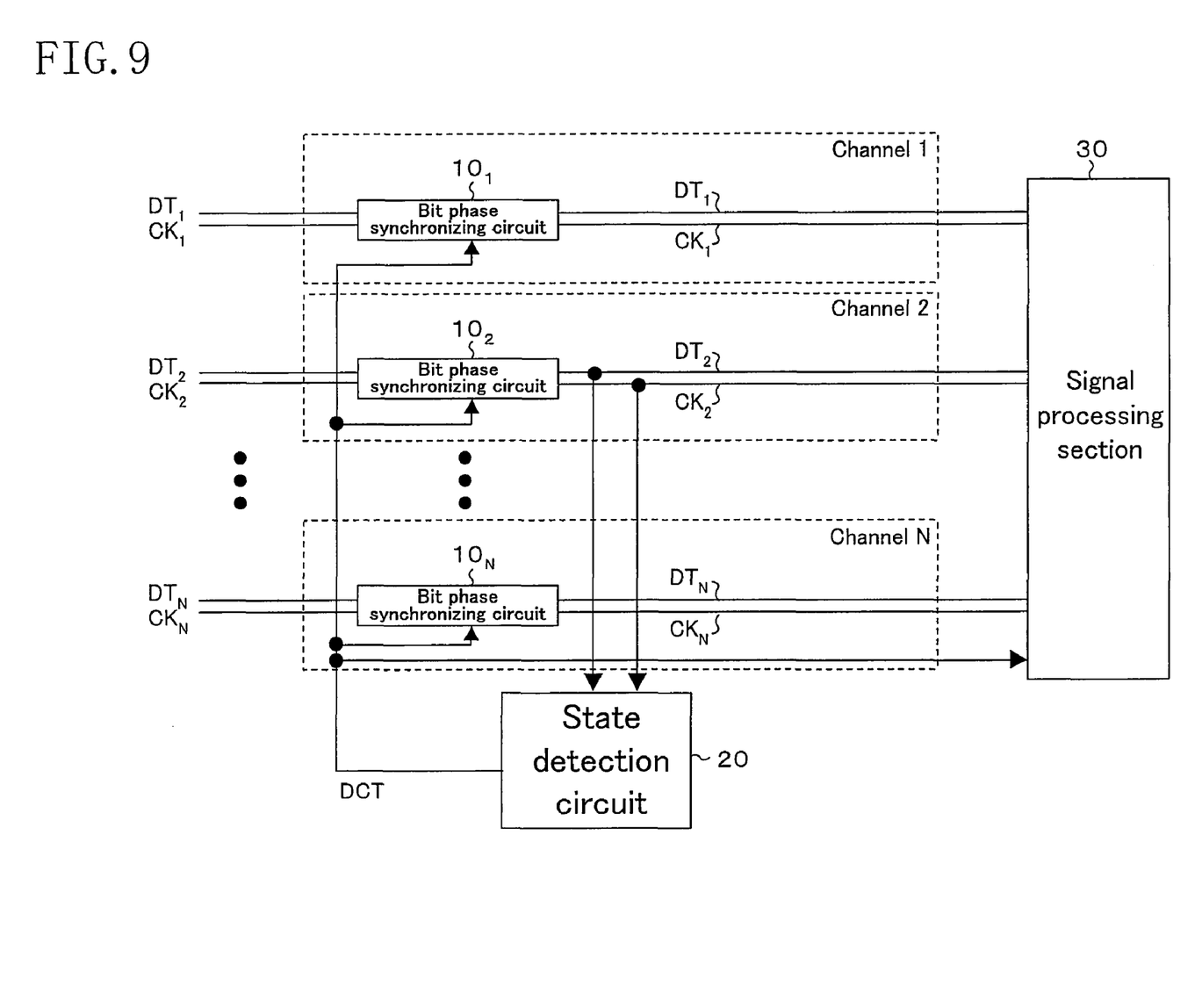
FIG. 9 is a view showing an example of the data receiver device of FIG. 7 in which a signal processing section is controlled with a detection signal.

As shown in FIG. 8, the data receiver device of this embodiment may be provided with an output control circuit 40 as in the case shown in FIG. 2. Otherwise, as shown in FIG. 9, the signal processing section 30 of the data receiver device of this embodiment may be controlled with the detection signal DCT as in the case shown in FIG. 3.

Embodiment 4

Figure 10:
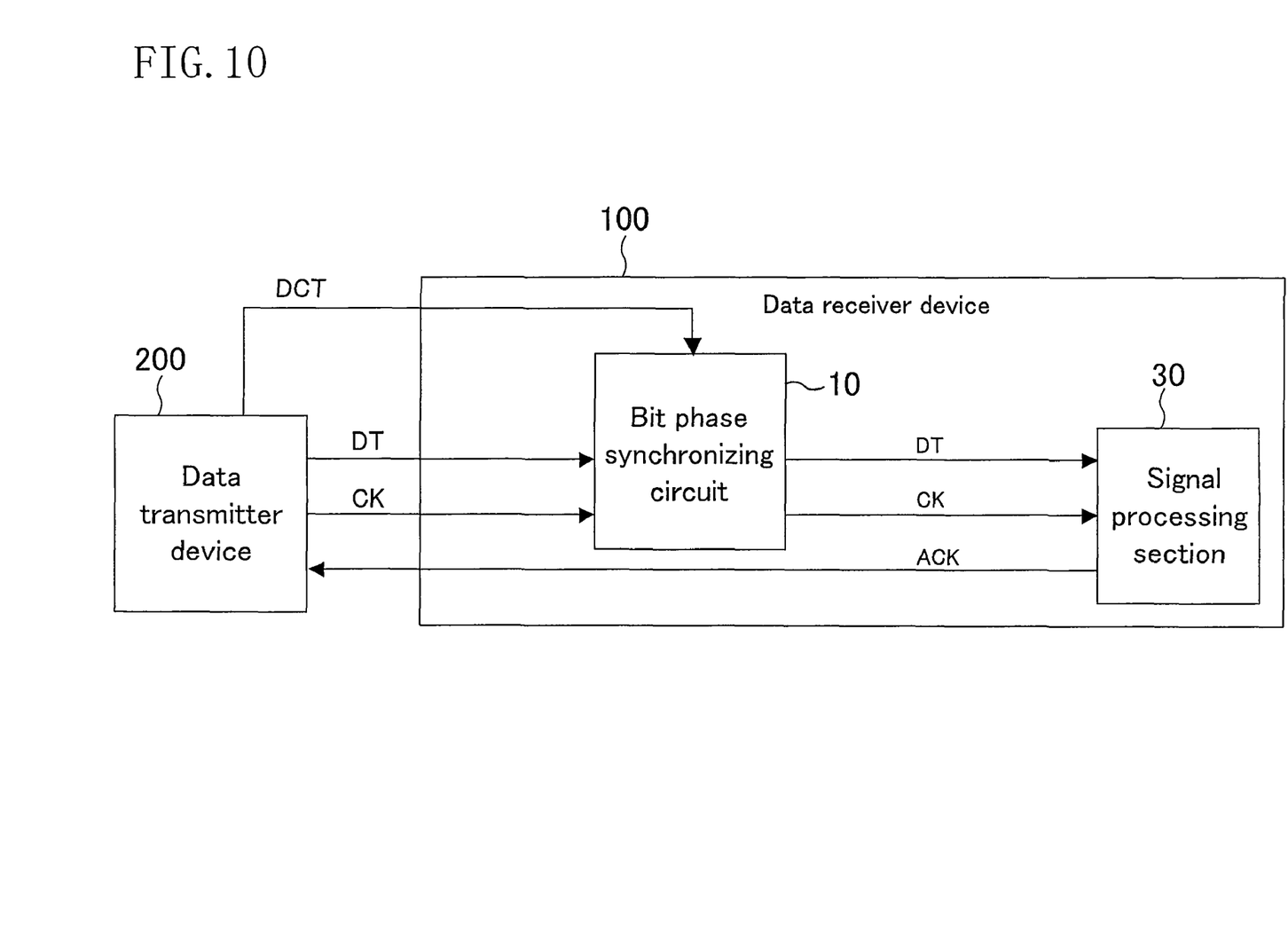
FIG. 10 is a block diagram of a data transmission/reception system of Embodiment 4.

FIG. 10 shows a configuration of a data transmission/reception system of Embodiment 4 of the present invention. The data transmission/reception system of this embodiment includes a data receiver device 100 and a data transmitter device 200.

The data receiver device 100 includes a bit phase synchronizing circuit 10 and a signal processing section 30. The bit phase synchronizing circuit 10, receiving a data signal DT and a clock signal CK outputted from the data transmitter device 200, performs phase adjustment of the data signal DT. More specifically, the bit phase synchronizing circuit 10 adjusts the phase of the data signal DT so that the data signal DT can be latched with the clock signal CK. The signal processing section 30 performs predetermined signal processing, such as decoding of the data signal DT, for example, based on the phase-adjusted data signal DT and the clock signal CK.

Hereinafter, description will be made taking an IEEE 1394 transmission/reception interface as an example. In the IEEE 1394 standard, the data receiver device 100 that has received the data signal DT transmitted from the data transmitter device 200 returns a reception acknowledge signal ACK indicating the reception status to the data transmitter device 200. Receiving the reception acknowledge signal ACK, also called an acknowledge packet, which is a signal indicating the reception status, the transmitter device 200 can detect that the data signal DT has been normally received by the data receiver device 100.

When receiving the reception acknowledge signal ACK, the data transmitter device 200 outputs a detection signal DCT. On receipt of the detection signal DCT, the bit phase synchronizing circuit 10 of the data receiver device 100 initializes the once-executed phase adjustment of the data signal DT. In other words, the data transmitter device 200 resets the phase relationship between the data signal DT and the clock signal CK set by the bit phase synchronizing circuit 10 once detecting that the data signal DT has been normally received by the data receiver device 100. The phase adjustment of the data signal DT is performed again starting from near the center of the adjustable range by the bit phase synchronizing circuit 10, and thus the reliability of data reception improves.

In the embodiments described above, a clock recovery circuit may be used as the bit phase synchronizing circuit 10. Using the clock recovery circuit, which generates a clock signal from a data signal, it is unnecessary to input the clock signal CK into the bit phase synchronizing circuit 10.

In the embodiments described above, the signal processing section 30 may be operated with an internal clock, not with the clock signal CK outputted from the bit phase synchronizing circuit 10.

INDUSTRIAL APPLICABILITY

The data receiver device of the present invention permits highly reliable data reception and thus is useful for a HDMI-compliant system requiring highly reliable data reception.

The invention claimed is:

1. A data receiver device for receiving a data signal to perform predetermined signal processing, comprising:
a bit phase synchronizing circuit for performing phase adjustment of the data signal to set a predetermined phase relationship between the data signal and a corresponding clock signal; and
a state detection circuit for outputting a detection signal once detecting that the data signal inputted into the bit phase synchronizing circuit is in a stable state based on a data signal phase-adjusted by the bit phase synchronizing circuit and a corresponding clock signal,
wherein the bit phase synchronizing circuit initializes the phase adjustment of the data signal when receiving the detection signal.

2. The data receiver device of claim 1, wherein the state detection circuit outputs the detection signal once detecting a predetermined signal pattern in the phase-adjusted data signal.

3. The data receiver device of claim 2, wherein the state detection circuit outputs the detection signal once detecting the predetermined signal pattern a plurality of times.

4. The data receiver device of claim 2, wherein the state detection circuit outputs the detection signal once detecting the predetermined signal pattern at a predetermined period.

5. The data receiver device of claim 1, further comprising an output control circuit for controlling output or not of the phase-adjusted data signal and the corresponding clock signal,
wherein the output control circuit controls the output of the phase-adjusted data signal and the corresponding clock signal when receiving the detection signal.

6. The data receiver device of claim 1, further comprising a signal processing section for performing the predetermined signal processing based on the phase-adjusted data signal and the corresponding clock signal when receiving the detection signal.

7. The data receiver device of claim 1, wherein the bit phase synchronizing circuit is a clock recovery circuit for generating the clock signal from the data signal.

8. The data receiver device of claim 1, comprising a plurality of said bit phase synchronizing circuits,
wherein the state detection circuit outputs the detection signal once detecting that a data signal inputted into at least one of the plurality of bit phase synchronizing circuits is in a stable state based on a data signal phase-adjusted by the at least one bit phase synchronizing circuit and a corresponding clock signal.

9. The data receiver device of claim 8, wherein the state detection circuit outputs the detection signal once detecting that all data signals inputted into the plurality of bit phase synchronizing circuits are in a stable state based on data signals phase-adjusted by the plurality of bit phase synchronizing circuits and corresponding clock signals.

10. The data receiver device of claim 8, further comprising an output control circuit for controlling output or not of a plurality of data signals phase-adjusted by the plurality of bit phase synchronizing circuits and corresponding clock signals, wherein the output control circuit controls the output of the plurality of phase-adjusted data signals and the corresponding clock signals when receiving the detection signal.

11. The data receiver device of claim 1, wherein the stable state is a state in which the data signal has a desirable amplitude value and a jitter component falling within an allowable range.

* * * * *